(12) United States Patent
Irle et al.

(10) Patent No.: US 12,434,527 B2
(45) Date of Patent: Oct. 7, 2025

(54) SENSOR SYSTEM FOR VEHICLES, IN PARTICULAR MOTOR VEHICLES, FOR DETECTING THE VEHICLE SPEED, THE VEHICLE LEVEL AND/OR THE STATE OF THE VEHICLE SUSPENSION, ARRANGEMENT FOR SUCH A SENSOR SYSTEM AND VEHICLE HAVING SUCH A SENSOR SYSTEM

(71) Applicant: Hella GmbH & Co. KGaA, Lippstadt (DE)

(72) Inventors: Henning Irle, Lippstadt (DE); Fabian Utermoehlen, Lippstadt (DE); Andreas Stumpf, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 659 days.

(21) Appl. No.: 17/727,451

(22) Filed: Apr. 22, 2022

(65) Prior Publication Data

US 2022/0242189 A1 Aug. 4, 2022

Related U.S. Application Data

(63) Continuation of application No. PCT/EP2020/077952, filed on Oct. 6, 2020.

(30) Foreign Application Priority Data

Oct. 22, 2019 (DE) .................... 10 2019 128 477.5

(51) Int. Cl.
*B60G 17/018* (2006.01)
*B60G 17/0165* (2006.01)
*B60G 17/019* (2006.01)

(52) U.S. Cl.
CPC ....... *B60G 17/018* (2013.01); *B60G 17/0165* (2013.01); *B60G 17/01908* (2013.01);
(Continued)

(58) Field of Classification Search
CPC . F16F 9/3292; G01D 5/202; B60G 17/01908; B60G 17/019; B60G 17/018;
(Continued)

(56) References Cited

U.S. PATENT DOCUMENTS 4,866,437 A    9/1989  Morra
8,589,015 B2 * 11/2013 Willis .................. G01C 25/005
                                                     701/1

(Continued)

FOREIGN PATENT DOCUMENTS

DE    3742976 A1    7/1988
DE    3918185 A1    12/1990
(Continued)

OTHER PUBLICATIONS

International Search Report dated Mar. 12, 2021 in corresponding application PCT/EP2020/077952.

*Primary Examiner* — An H Do
(74) *Attorney, Agent, or Firm* — Muncy, Geissler, Olds & Lowe, P.C.

(57) ABSTRACT

An arrangement for a sensor system for vehicles, in particular motor vehicles, for detecting the vehicle speed, the vehicle level and/or the state of the vehicle suspension, having a sensor for measuring the level of a point on a vehicle body and a vibration damper, the vibration damper comprising a first part and a second part which are movable relative to each other, and wherein the level sensor has an excitation coil, at least one receiver coil and at least one electrically conductive element, wherein the excitation coil and the at least one receiver coil are arranged on the second (Continued)

part of the vibration damper and the electrically conductive element is arranged on the first part of the vibration damper or the first part comprises or forms the electrically conductive element.

14 Claims, 3 Drawing Sheets

(52) U.S. Cl.
CPC .. *B60G 17/01933* (2013.01); *B60G 2400/102* (2013.01); *B60G 2400/204* (2013.01); *B60G 2400/208* (2013.01); *B60G 2400/252* (2013.01); *B60G 2400/41* (2013.01); *B60G 2401/17* (2013.01); *B60G 2600/042* (2013.01); *B60G 2600/26* (2013.01); *B60G 2800/70* (2013.01)

(58) Field of Classification Search
CPC .......... B60G 17/01933; B60G 17/0165; B60G 2600/26; B60G 2400/252; B60G 2401/17; B60G 2600/042; B60G 2600/08; B60G 2400/208; B60G 2400/41; B60G 2800/70; B60G 2400/102; G01P 3/803; G01P 15/00; G01M 17/04

See application file for complete search history.

(56) References Cited

U.S. PATENT DOCUMENTS

| | | | |
|---|---|---|---|
| 11,453,387 B1* | 9/2022 | Huennekens | B60W 10/04 |
| 11,987,092 B2* | 5/2024 | Hwang | B60G 17/0195 |
| 12,157,478 B2* | 12/2024 | Irle | G01D 3/08 |
| 12,220,960 B2* | 2/2025 | Smits | B60G 17/00 |
| 2011/0303011 A1* | 12/2011 | Fu | G01N 29/28 |
| | | | 73/579 |

FOREIGN PATENT DOCUMENTS

| | | |
|---|---|---|
| DE | 4313973 A1 | 11/1994 |
| DE | 10051056 A1 | 4/2002 |
| DE | 202008008477 U1 | 10/2008 |
| DE | 102013003148 B3 | 5/2014 |

* cited by examiner

SENSOR SYSTEM FOR VEHICLES, IN PARTICULAR MOTOR VEHICLES, FOR DETECTING THE VEHICLE SPEED, THE VEHICLE LEVEL AND/OR THE STATE OF THE VEHICLE SUSPENSION, ARRANGEMENT FOR SUCH A SENSOR SYSTEM AND VEHICLE HAVING SUCH A SENSOR SYSTEM

This nonprovisional application is a continuation of International Application No. PCT/EP2020/077952, which was filed on Oct. 6, 2020, and which claims priority to German Patent Application No. 10 2019 128 477.5, which was filed in Germany on Oct. 22, 2019, and which are both herein incorporated by reference.

BACKGROUND OF THE INVENTION

Field of the Invention

The present invention relates to a sensor system for vehicles, in particular motor vehicles, for detecting a vehicle speed, a vehicle level and/or a state of a vehicle suspension, an arrangement for such a sensor system, a vehicle having such a sensor system, a method for detecting the vehicle speed, and a method for detecting the state of a vehicle suspension.

Description of the Background Art

A vehicle level is generally the distance of a reference plane on a vehicle body from the ground. In practice, the level varies as a function of the load state of the vehicle. Vehicle level sensors known from the prior art are often based on a change in the vertical vehicle movement due to a level change to a rotary movement, which is then usually measured based on magnetic or inductive principles. Such a vehicle level sensor may have a housing that is connected to the vehicle, for example to the body, and in which electronic components are arranged. The sensor can be electrically connected to the rest of the vehicle via connectors. A lever can be attached to the housing rotatable about an axis of rotation, which has a ball at the end. This ball can be connected to other mechanical components of the vehicle, which are attached to the chassis, for example. Such a sensor can be used between the chassis and the body. A linear movement between the chassis and the body can be converted into a rotary movement by means of such a sensor, which can then be converted into an electrical signal by means of a rotary angle sensor.

In particular, the other mechanical components mentioned can be complex and subject to tolerance. This can cause the accuracy of the system including the level sensor and the mechanical components to be inaccurate.

There is therefore a need to reduce the complexity of the systems and increase accuracy.

Furthermore, wheel speed sensors are known, which have a magnetic field sensor with a back bias magnet and a ferromagnetic sensor wheel having teeth and gaps between the teeth, which rotates about a rotary axis and is coupled to the wheel. The magnet generates a magnetic field in which the magnetic field sensor is arranged. At least one magnetic circuit of the magnetic field can be detected by means of the magnetic field sensor. By moving the teeth and gaps through the magnetic field generated by the magnet, a change in the magnetic circuit is caused. The magnetic field sensor scans the changes and generates a pulsed signal from the frequency of which the wheel speed can be calculated.

The vehicle speed can be calculated back from the wheel speed. The disadvantage here is that the speed depends on the diameter of the wheels and is therefore also dependent on air pressure, for example. This leads to a relatively high measurement error, so that the speed information cannot be used, for example, to check the plausibility of other sensors in highly automated vehicles.

Here, too, there is a need to increase accuracy.

SUMMARY OF THE INVENTION

It is therefore an object of the present invention to provide an arrangement for an accurate sensor system for vehicles, in particular motor vehicles, that is suitable for detecting a vehicle speed and/or a vehicle level.

The object is achieved in that, according to an exemplary embodiment of the invention, an arrangement for a sensor system is proposed, which comprises a sensor for measuring the level of a point on a body of the vehicle, and a vibration damper, the vibration damper comprising a first part and a second part, which are movable relative to each other, and the sensor having an excitation coil, at least one receiver coil and at least one electrically conductive element, wherein the excitation coil and the at least one receiver coil are arranged on the first part and the electrically conductive element on the second part of the vibration damper, or the second part comprises or forms the electrically conductive element.

The arrangement of sensor and vibration damper creates a unit that allows for the level to be detected without complex mechanics. For the sensor, the simple mechanism of the vibration damper (also commonly referred to as shock absorber) is used, on which the elements (excitation coil, at least one receiver coil, at least one electrically conductive element) are arranged.

The first part of the vibration damper can be a cylinder and the second part of the vibration damper can be a tappet immersed in the first part. In the cylinder, a liquid, in particular an oil may be provided that is moved in a manner known from dampers by the tappet or a piston connected to the tappet.

The sensor may have a holder attached to the tappet. The excitation coil and at least one receiver coil may be attached to this holder. The holder can be pot-shaped. The first part, for example the cylinder of the vibration damper, can be immersed in the holder during a movement of the first part and the second part of the vibration damper relative to one another. As a result, the electrically conductive element provided on the second part, or the electrically conductive element comprised or formed by the second part and the coils arranged on the first part can be moved relative to each other if the level of the body changes with respect to the chassis.

The sensor may have a source for generating an excitation signal connected to the excitation coil. The excitation signal can have an AC voltage signal with a frequency of 1 MHz and 10 MHz (preferably 3.5 MHz) and amplitudes in the range of a few volts. The excitation coil can be connected in an LC oscillating circuit.

The arrangement may have a sensor for measuring the acceleration of a point on the vehicle perpendicular to a reference plane on the vehicle, wherein the sensor for measuring acceleration is arranged on the first or second part of the vibration damper. The sensor for measuring acceleration can be an Inertial Measurement Unit (IMU) by means of which further variables can be measured.

The inventive idea also achieves the object of proposing a sensor system for vehicles, in particular motor vehicles, that is suitable for detecting the vehicle speed and/or a vehicle level.

The object is achieved by a sensor system for vehicles, in particular motor vehicles, for detecting the vehicle speed, the vehicle level and/or the state of the vehicle suspension, which comprises: at least one sensor for measuring the level of a point on a body of the vehicle and/or at least one sensor for measuring the acceleration of a point on the vehicle perpendicular to a reference plane on the vehicle, an evaluation unit, by means of which using correlation a time interval between two sections with high similarity and the distance of the vehicle axles is determined on the basis of a signal curve, which is determined by means of the sensor or the sensors over a period of time, of a level signal supplied by the sensor and/or an acceleration signal supplied by the sensor.

If a vehicle uses a sensor system with only one sensor to measure the level of a point on a vehicle body or only one sensor to measure the acceleration of a point on the vehicle perpendicular to a reference plane on the vehicle, similar measurement results are obtained by the sensor attached to the vehicle body when traveling over a ground unevenness, namely when traveling over the uneven ground with the front axle and, a little later, when traveling over the uneven ground with the rear axle. By means of autocorrelating the measurement signal provided by the sensor, these similarities can be determined. It is also possible to determine the time interval between the occurrence of the similarities. Since the distance between the vehicle axles is known, the vehicle speed can be determined.

If a sensor system with two sensors is used in a vehicle, these are preferably provided at the front and rear of the vehicle. When driving over a ground unevenness, the two sensors provide similar measurement results one after the other, namely when traveling over the unevenness with the front axle and, a little later, when traveling over the unevenness with the rear axle. By cross-correlation of the measurement signals provided by the sensors, these similarities can be determined. Furthermore, it is possible to determine the time interval of the occurrence of the similarities. Since the distance between the vehicle axles is known, the speed of the vehicle can be determined.

The sensor system may have a pair of sensors to measure the level of a point on a body of the vehicle. Alternatively, the sensor system may have a pair of sensors to measure the acceleration of a point on the vehicle perpendicular to a reference plane on the vehicle. However, the sensor system can also have two pairs of the sensor for measuring the level and the at least one sensor for measuring acceleration.

A vehicle according to the invention may be equipped with a sensor system according to the invention. The sensor system of a vehicle according to the invention may have a pair of sensors. A first sensor of the pair may be located at a first point in or on the vehicle and a second sensor of the pair may be located at a second point in or on the vehicle, wherein the second point lies behind the first point when viewed in the longitudinal direction of the vehicle. The first point can be on or near a front wheel and the second point can be on or near a rear wheel. Preferably, the first point and the second point are mounted on the same sides of a vehicle. Preferably, the sensor system of a vehicle according to the invention may have two pairs of a sensor for measuring the level of a point on a body of the vehicle and at least one sensor for measuring the acceleration of a point on the vehicle perpendicular to a reference plane on the vehicle. A first pair of sensors may be located at a first point, for example on or near a front wheel, and a second pair at a second point, for example on or near a rear wheel.

In a vehicle according to the invention, the vehicle speed can be determined by means of the sensor system in that, by means of one of the sensors or the sensor at the first point on the vehicle, when traveling over a ground unevenness, a change in the level of the body and/or the acceleration of the first point on the vehicle relative to the reference plane is detected at a first point in time and, at a time interval to a second point in time, a change in the level of the body and/or the acceleration of the second point on the vehicle relative to the reference plane is detected by means of one of the sensors or the sensor at the second point on the vehicle when traveling over the same unevenness. The time interval can be measured. If the time interval is known, the speed can be calculated with a known spatial distance of the first point from the second point. For this purpose, the quotient can be formed from the known spatial distance of the first point and the second point and from the time interval determined from the signals of the sensors, which corresponds to the vehicle speed. The time interval can be determined, for example, with the aid of common methods for similarity/pattern recognition of signals (e.g., cross-correlation). The course of the sensor signal of the sensor for measuring the level and/or the sensor for measuring the acceleration of the first pair can be compared with the corresponding sensor signal of the second pair.

With a sensor system according to the invention, the state of the vehicle suspension can be detected. For this purpose, after traveling over a ground unevenness, as a function of the load state determined on the basis of the measured level of the body and the acceleration of the body in the direction perpendicular to a reference plane on the vehicle, a target vibration curve is determined, which is compared with a vibration curve measured by means of at least one of the sensors. For example, for determining the target vibration curve with the vehicle suspension intact, the following two methods can be selected:

Firstly, it is possible to calculate the target vibration curve from the measured vehicle level, which reflects the load state, and from the measured acceleration and, if necessary, from further known parameters determining the vibration behavior.

Secondly, it is possible to determine the target vibration curve depending on the values measured by the sensors by looking it up in a look-up table which is stored in a memory of the evaluation unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
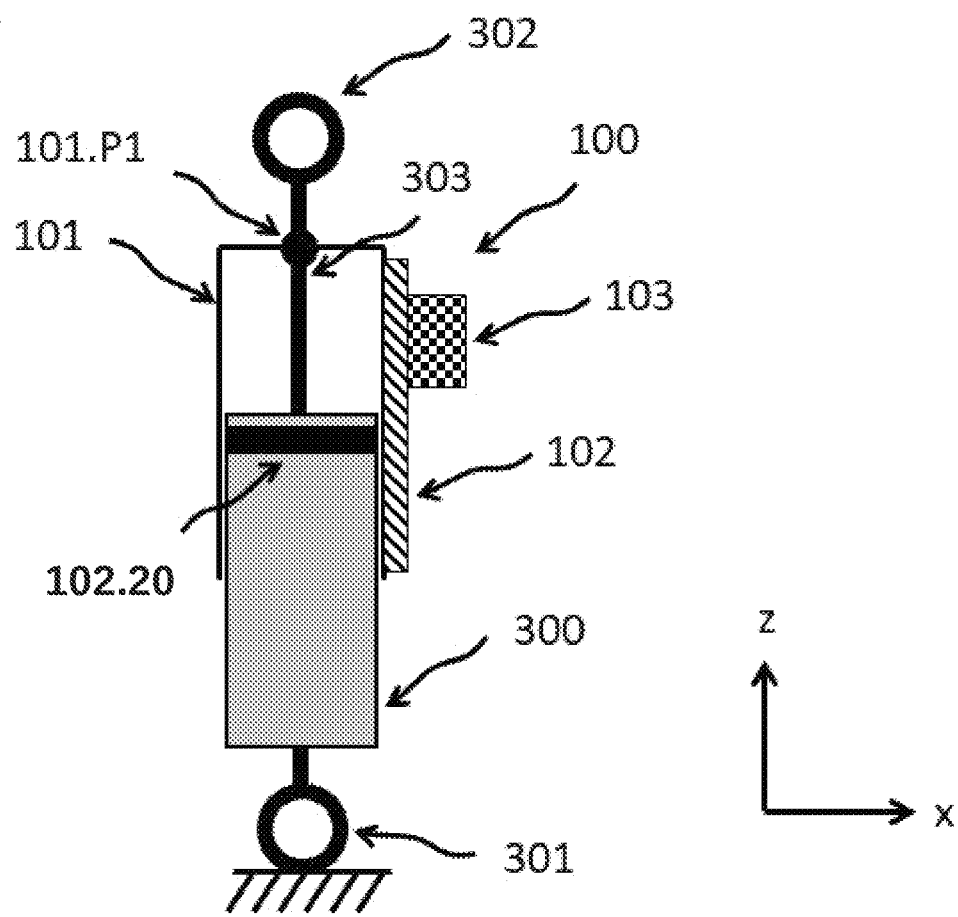
FIG. 1 is an arrangement according to the invention having a vibration damper, a sensor for measuring the level and a sensor for measuring acceleration.

The example of an arrangement according to the invention shown in FIG. 1 includes the vibration damper 300, 301, 302, 303 and a pair of 100 sensors comprising the level sensor 102 and the accelerometer 103.

The damper 300, 301, 302, 303 essentially corresponds to a known damper and is connected to the vehicle via two elements 301, 302. Without loss of generality, the element 301 can be assumed to be connected to the body and the element 302 connected to the chassis. The damper can be movable in the z-direction. A tappet 303 connected to the element 302 may be immersed into or emerge from a cylinder 300 of the damper 300, 301, 302, 303 connected to the element 301.

The sensor system 100 according to the invention has an essentially pot-shaped holder 101, which is formed of electrically non-conductive material (e.g., plastic PPE or similar). This radially surrounds the cylinder 300 of the damper 300, 301, 302, 303 at a distance and is connected to the tappet 303 at a point 101.P1. This leads to the fact that the holder 101 also slides in the z-direction over the cylinder 300 when the coupling element 303 is immersed in the cylinder 300 of the damper 300, 301, 302, 303.

The surface of the cylinder 300, which is covered by the holder 101, is therefore a measure of the compression depth of the body and thus the desired measurand for determining the vehicle level.

The level sensor used in the example uses an inductive measuring principle. It is a linear displacement sensor.

The linear displacement sensor 102 has a sensor circuit board that can be integrated into the housing 101. The printed circuit board preferably is formed of FR4 and is two- or four-layer. It carries (see FIG. 2) at least one excitation coil 102.10, which is essentially rectangular and may have one or more windings in one or more planes of the printed circuit board 102.

Figure 3:
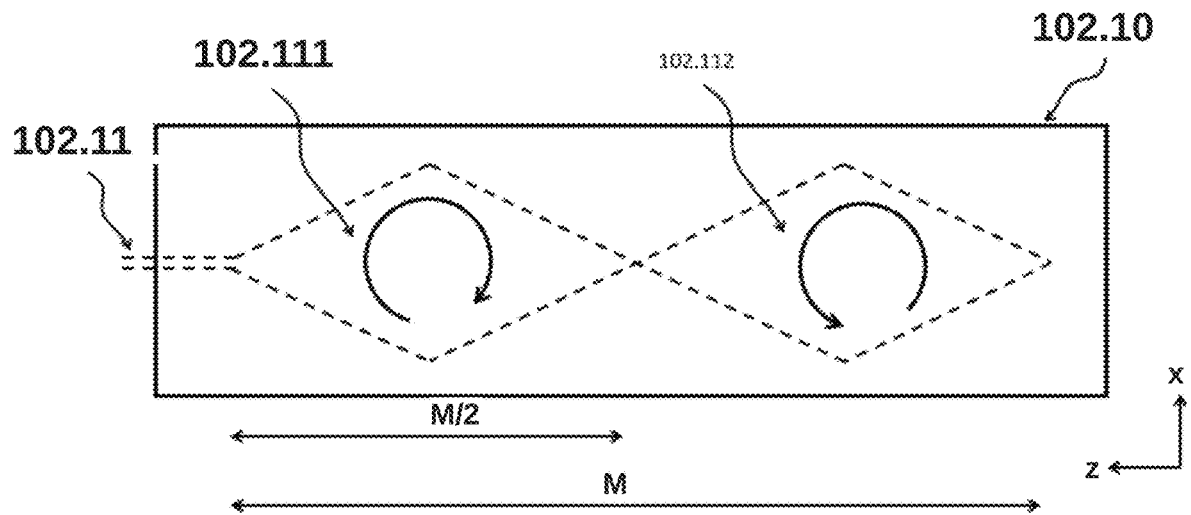
FIG. 3 is a schematic representation of an arrangement of the excitation coil and a first of the receiver coils.

In addition, the printed circuit board 102 carries at least one, preferably two and particularly preferably three receiver coils 102.11, 102.12, 102.13, which may be arranged within the excitation coil 102.10, outside the excitation coil 102.10 or both inside and outside the excitation coil 102.10. The detailed view of a first receiver coil 102.11 is shown in FIG. 3.

Preferably, the receiver coil 102.11 has an identical number of right- and left-running partial turns 102.111, 102.112, which have an essentially identical geometry and are connected in series. FIG. 3 shows a lateral expansion (in the z-direction) of M, wherein the transition point of the two partial turns 102.111, 102.112 is positioned at M/2.

Figure 2:
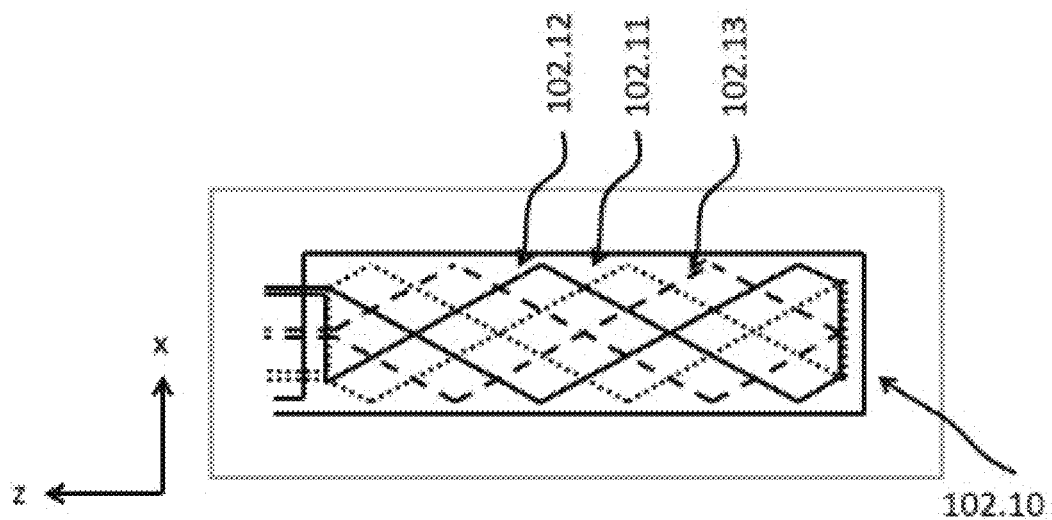
FIG. 2 is a schematic representation of a unit comprising the excitation coil and three receiver coils of the sensor for measuring the level.

The other receiver coils 102.12, 102.13 are intended for a multiphase system (FIG. 2). They can be moved relative to the receiver coil 102.11. The displacement can be M/4 when using two receiver coils or M/n when using n receiver coils. Optionally, the part of the receiver coils that protrudes beyond the value M in the negative z-direction can be supplemented in a positive z-direction (on the opposite side of the structure).

According to the invention, the excitation coil 102.10 can be exposed to an AC voltage which has a frequency between 1 MHz and 10 MHz (preferably 3.5 MHz) and amplitudes in the range of a few volts. For this purpose, it may preferably be connected as a frequency-determining element in an LC oscillating circuit.

In the receiver coils 102.11, 102.12, 102.13 voltages are induced, which are influenced in their amplitudes by a spaced, positioned electrically conductive element 102.20 which is attached to the cylinder 300 of the damper. By measuring the amplitudes of the voltages induced in the receiver coils 102.11, 102.12, 102.13, the position of the electrically conductive element 102.20 and thus the compression depth of the tappet 303 in the cylinder 300 can then be calculated.

The electrically conductive element 102.20 is attached either in or to the cylinder 300. Alternatively, however, the cylinder 300 itself can act as a conductive element of the inductive linear displacement sensor. For this, the cylinder 300 must have a certain electrical conductivity. With conventional dampers, this is easily given or at least possible.

On the PCB 102 another sensor 103 is applied. This sensor 103 is an inertial measurement unit (IMU), which has at least one accelerometer whose sensitive direction coincides with the z-axis. Preferably, however, the IMU 103 also contains accelerometers with other sensitive axes or rotation rate sensors.

Sensor signals of the level sensor and the IMU 103 are preferably transmitted via the same interface. The interface can be a PSI5 digital interface. In addition to the use of the acceleration values for the control of adaptive chassis systems, the information according to the invention is used to derive further variables.

The algorithms described below can be calculated in a vehicle control unit or in a separate sensor control unit. This requires at least two pairs of sensors, in each case one on the front wheel VR and one on the rear wheel HR.

Figure 4:
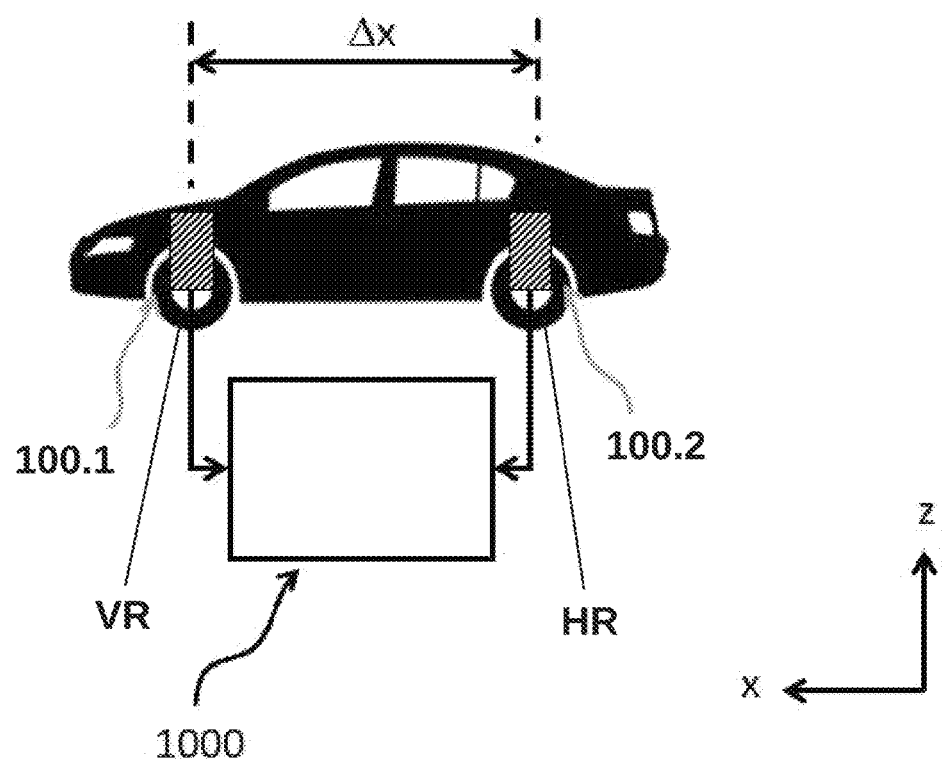
FIG. 4 shows a vehicle having a sensor system comprising the sensors of two arrangements according to the invention.
Figure 5:
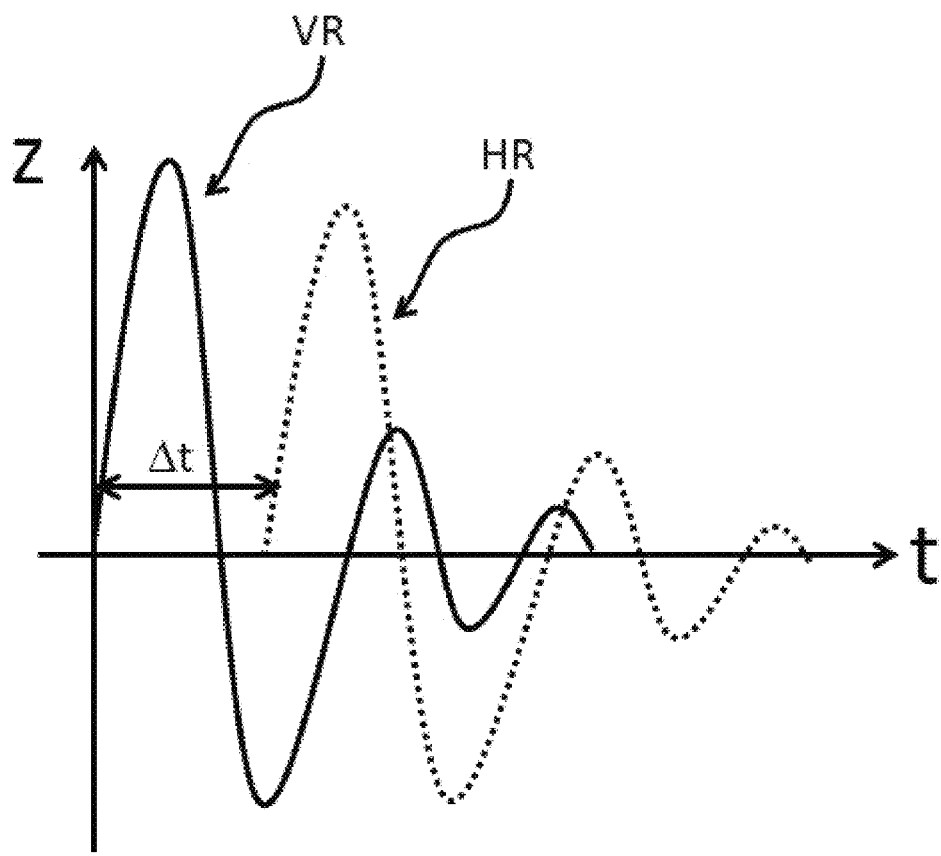
FIG. 5 shows a signal curve from the sensor to measure the level.

To determine the vehicle speed, the following approach may be used:

FIG. 4 shows the arrangement of two sensor pairs 100.1, 100.2 on a vehicle. FIG. 5 shows the signal of the linear displacement sensors and FIG. 6 the signal of the IMU (only acceleration $a_z$ in the z-direction). It is assumed that the front wheel VR drives over a curb at time t=0, for example, and thus experiences an acceleration that leads to an almost exponentially subsiding linear movement z due to the spring-damper behavior. Since the vehicle moves in the forward direction, a time interval Δt later the rear wheel HR experiences an approximately identical acceleration as well as a nearly identical course of linear movement (exact course depends on the load state, etc.). From the information Δx, which represents the distance of the wheels of the vehicle, the vehicle speed vx=Δx/Δt can be calculated from an evaluation unit 1000. This information can be used, for example, to check the plausibility of other systems in the vehicle. The evaluation unit 1000 also determines the value Δt using common methods for similarity/pattern recognition of signals (e.g., cross-correlation).

Figure 6:
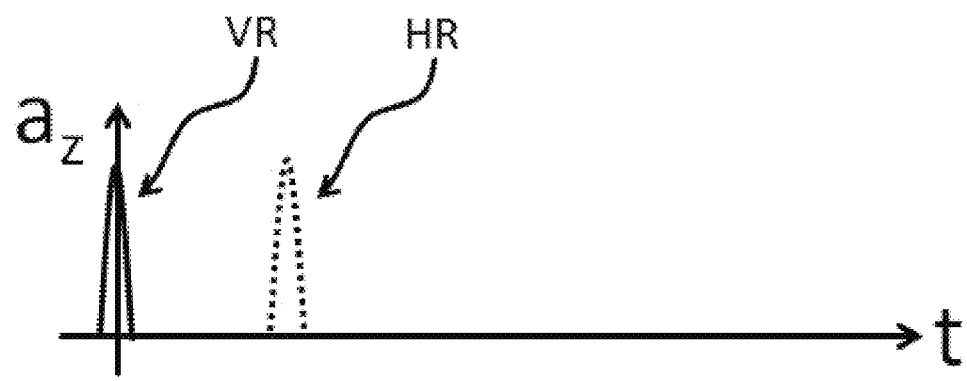
FIG. 6 shows a signal curve from the sensor to measure acceleration.

To determine the state of the suspension, the following approach can be used:

In addition to the vehicle speed, the state of the suspension can also be assessed. For this purpose, a sensor pair 100 is used. FIGS. 5 and 6 show that an acceleration (e.g., by driving over a pothole) is followed by a certain oscillation of the damper. This depends in its shape on the vehicle load and the state of the suspension/damper:

The load can be estimated by determining the compression depth of the damper. For this purpose, however, the vehicle must be located on a flat surface. When this is the case can be detected via the IMU.

If, for example, the suspension is broken, this affects the post-oscillation behavior of the vehicle. This effect can be so weak that it is not perceived by the driver. However, metrological detection is possible.

For this purpose, an algorithm or look-up tables are stored in the evaluation unit 1000, which calculate which post-oscillation behavior would be expected as a function of the load state and an acceleration. If this does not correspond to the actual measured behavior, either the suspension or the damper is damaged, or the air pressure of the tire has changed.

Cyclic calibration or the consideration of aging and/or temperature influences is possible using common machine learning methods.

By combining the vehicle level sensor 102 with an inertial measurement unit 103, which determines at least the acceleration in the vertical direction, an improvement in the accuracy of the level is possible. By combining at least two sensor pairs 100.1, 100.2, the vehicle speed can be determined.

In order to keep the tolerances of the mechanics small, a solution is particularly preferably described in which the vehicle level is measured directly by measuring the compression depth of the vehicle with the aid of a linear displacement sensor 102. A sensor system according to the invention may additionally comprise an evaluation unit 1000, which evaluates the signals of at least two sensor pairs 100.1, 100.2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor system for motor vehicles, for detecting a vehicle speed, a vehicle level and/or a state of the vehicle suspension, the system comprising:
    at least one first sensor for measuring a level of a point on a body of the vehicle;
    at least one second sensor for measuring an acceleration of a point on the vehicle perpendicular to a reference plane on the vehicle; and
    an evaluation unit, configured to determine a vehicle speed from a distance between axles of the vehicle and a signal curve, determined over a period of time, of a level signal supplied by the at least one first sensor and/or a signal profile, determined over a period of time, of an acceleration signal supplied by the at least one second sensor, wherein the vehicle speed is determined by correlating the distance between the axles of the vehicle and a time interval between two similar sections of the signal curve of the level signal and/or a time interval between two similar sections of the signal curve of the acceleration signal.

2. The sensor system according to claim 1, wherein the sensor system comprises a pair of the at least one first sensor for measuring the level of the point on the body of the vehicle.

3. The sensor system according to claim 1, wherein the sensor system comprises a pair of the at least one second sensor for measuring the acceleration of the point on the vehicle perpendicular to the reference plane on the vehicle.

4. The sensor system according to claim 1, wherein the sensor system comprises two pairs of the at least one first sensor for measuring the level and the at least one second sensor for measuring the acceleration.

5. A vehicle comprising the sensor system according to claim 1.

6. The vehicle according to claim 5, further comprising a first pair of the at least one first sensor and a first pair of the at least one second sensor, wherein one of the first sensors of the first pair of the at least one first sensor and one of the second sensors of the first pair of the at least one second sensor are arranged at a first point in or on the vehicle and the other first sensor of the first pair of the at least one first sensor and the other second sensor of the first pair of the at least one second sensor are arranged at a second point in or on the vehicle, wherein the second point lies behind the first point when viewed in the longitudinal direction of the vehicle.

7. The vehicle according to claim 6, further comprising a second pair of the at least one first sensor and a second pair of the at least one second sensor, one of the first sensors of the second pair of the at least one first sensor and one of the second sensors of the second pair of the at least one second sensor are located at a third point in or on the vehicle and the other first sensor of the second pair of the at least one first sensor and the other second sensor of the second pair of the at least one second sensor are located at a fourth point in or on the vehicle, wherein the fourth point lies behind the third point when viewed in the longitudinal direction of the vehicle, and wherein the first pair of the at least one first sensor and the first pair of the at least one second sensor are arranged on a right-hand side of the vehicle and the second pair of the at least one first sensor and the second pair of the at least one second sensor are arranged on a left-hand side of the vehicle.

8. The vehicle according to claim 5, wherein a first pair of sensors, that includes a first one of the at least one first sensor and a first one of the at least one second sensor, is located at a first point in or on the vehicle and a second pair of sensors, that includes a second one of the at least one first sensor and a second one of the at least one second sensor, is located at a second point in or on the vehicle, and wherein the second point lies behind the first point when viewed in the longitudinal direction of the vehicle.

9. The vehicle according to claim 8, wherein a third pair of sensors, that includes a third one of the at least one first sensor and a third one of the at least one second sensor, is arranged at a third point in or on the vehicle, and a fourth pair of sensors that includes a fourth one of the at least one first sensor and a fourth one of the at least one second sensor, is arranged at a fourth point in or on the vehicle, the fourth point lies lying behind the third point when viewed in the longitudinal direction of the vehicle, and wherein the first and second pairs of sensors are arranged on a right-hand side of the vehicle and the third and fourth pairs of sensors are arranged on a left-hand side of the vehicle.

10. A method for detecting the vehicle speed in the vehicle according to claim 5, the method comprising:

detecting, when traveling over ground unevenness, a change in a level of the body and/or the acceleration of a first point on the vehicle relative to a reference plane, via one first sensor of the at least one first sensor and/or one second sensor of the at least one second sensor arranged at the first point on the vehicle; and detecting a time interval, a change in the level of the vehicle body and/or in the acceleration of a second point on the vehicle relative to the reference plane, via another first sensor of the at least one first sensor and/or another second sensor of the at least one second sensor arranged at the second point on the vehicle when traveling over the same ground unevenness; and determining a vehicle speed from a quotient of a known distance between the first point and the second point and from the time interval determined from the level signals of the sensors.

11. A method for monitoring a tire pressure in the vehicle according to claim 5, wherein the vehicle further comprises speed sensors for detecting a speed of the wheels of the vehicle, the method comprising:

recording a first value for the speed of the vehicle by the speed sensors;

recording a second value for the speed of the vehicle;

comparing the first value and the second value and, in the event of a deviation beyond a predetermined value and/or an increase in the deviation, a signal is generated requesting the driver to check the tire pressure.

12. A method for monitoring a steering angle of the vehicle according to claim 5, the method comprising:

detecting, when traveling over a first ground unevenness, a change in a level of the body or in the acceleration of a first point on the vehicle relative to a reference plane by one first sensor of the at least one first sensor and/or one second sensor of the at least one second sensor arranged at the first point on the vehicle;

detecting, at a time interval, a change in the level of the body or in the acceleration of a second point on the vehicle relative to the reference plane, via another first sensor of the at least one first sensor and/or another second sensor of the at least one second sensor arranged at the second point on the vehicle, when traveling over the first ground unevenness;

detecting the time interval;

determining a speed of a right side of the vehicle from a quotient of a known distance between the first point and the second point and from the time interval determined from the level signals of the sensors;

detecting a change in the level of the body or in the acceleration of a third point on the vehicle relative to the reference plane, via a third first sensor of the at least one first sensor and/or a third second sensor of the at least one second sensor arranged at the third point on the vehicle when traveling over a second ground unevenness, at the same time as traveling over the first ground unevenness, and, at a time interval, a change in the level of the body or in the acceleration of a fourth point on the vehicle relative to the reference plane is detected by a fourth first sensor of the at least one first sensor and/or a fourth second sensor of the at least one second sensor arranged at the fourth point on the vehicle when traveling over the second ground unevenness and the time interval is detected; and determining a speed on the left-hand side of the vehicle from the quotient of the known distance between the third point and the fourth point and of the time interval determined from the level signals of the sensors.

13. A method for detecting the state of the vehicle suspension having the sensor system according to claim 7, the method comprising:

using an algorithm stored in the evaluation unit for a calculation of a course of a vibration after traveling over a ground unevenness;

calculating a target vibration curve with the vehicle suspension intact from a load state determined from the level of the body measured by the at least one of the first second or from the acceleration measured by the at least one second sensor, or after traveling over the ground unevenness, with the vehicle suspension intact, a target vibration curve is read out from a memory of the evaluation unit as a function of the load state determined from the level of the vehicle body measured by the at least one first sensor and from the acceleration measured by the at least one second sensor; and comparing the target vibration curve, with the vehicle suspension intact, with an actual vibration curve measured by at least one of the first or second sensors after traveling over the ground unevenness.

14. The sensor system according to claim 1, wherein the at least one first sensor is a linear displacement sensor.

* * * * *